US006778638B1

(12) United States Patent
Jean et al.

(10) Patent No.: US 6,778,638 B1
(45) Date of Patent: Aug. 17, 2004

(54) PROCESSES AND SYSTEMS FOR CREATING MAINTENANCE REPORTS FOR COMMUNICATIONS SYSTEMS

(75) Inventors: David R. Jean, Palo Alto, CA (US); Judy M. Marcopulos, Duluth, GA (US); Rita H. Scherer, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/946,397

(22) Filed: Sep. 4, 2001

(Under 37 CFR 1.47)

(51) Int. Cl.[7] .......................... H04M 1/24; H04M 3/08; H04M 3/22
(52) U.S. Cl. .................... 379/9.02; 379/9.04; 379/9.03; 379/15.03; 714/100; 714/25
(58) Field of Search .................... 379/1.01, 9, 9.02, 379/9.03, 9.04, 15.01, 15.02, 15.03, 26.01, 29.01, 29.05, 29.09, 32.01; 714/100, 25, 48, 57

(56) References Cited

U.S. PATENT DOCUMENTS

| 4,464,543 | A | | 8/1984 | Kline et al. |
| 5,155,761 | A | | 10/1992 | Hammond ..................... 379/67 |
| 5,285,494 | A | | 2/1994 | Sprecher et al. |
| 5,406,616 | A | | 4/1995 | Bjorndahl ..................... 379/59 |
| 5,689,550 | A | | 11/1997 | Garson et al. |
| 5,784,438 | A | | 7/1998 | Martinez ..................... 379/89 |
| 5,790,633 | A | * | 8/1998 | Kinser, Jr. et al. ......... 379/9.02 |
| 5,793,771 | A | | 8/1998 | Darland et al. ............. 370/467 |
| 5,946,372 | A | * | 8/1999 | Jones et al. .............. 379/10.01 |
| 5,946,373 | A | | 8/1999 | Harris |
| 6,006,171 | A | | 12/1999 | Vines et al. |
| 6,018,567 | A | * | 1/2000 | Dulman .................... 379/32.03 |
| 6,032,039 | A | | 2/2000 | Kaplan ........................ 455/413 |
| 6,173,047 | B1 | | 1/2001 | Malik .......................... 379/207 |
| 6,175,859 | B1 | | 1/2001 | Mohler ....................... 709/206 |
| 6,289,382 | B1 | * | 9/2001 | Bowman-Amuah ......... 709/226 |
| 6,295,540 | B1 | | 9/2001 | Sanschargrin et al. |
| 6,353,902 | B1 | * | 3/2002 | Kulatunge et al. .......... 714/712 |
| 6,401,090 | B1 | | 6/2002 | Bailis et al. |
| 6,445,774 | B1 | * | 9/2002 | Kidder et al. .............. 379/9.03 |
| 6,446,123 | B1 | | 9/2002 | Ballantine et al. |
| 6,493,694 | B1 | | 12/2002 | Xu et al. |
| 6,614,882 | B1 | * | 9/2003 | Beamon et al. ........... 379/27.01 |

FOREIGN PATENT DOCUMENTS

| WO | WO 0245393 | * | 6/2002 | ............ H04M/3/00 |

OTHER PUBLICATIONS

An Extensible Message Format for Message Disposition Notifications, R. Fajman, National Institutes of Health, Mar., 1998.

(List continued on next page.)

*Primary Examiner*—Quoc D. Tran
(74) *Attorney, Agent, or Firm*—Cantor Colburn LLP

(57) ABSTRACT

Processes and systems are disclosed for creating a maintenance report for a communications system. One embodiment includes communicating with a communications network and acquiring a telephone line record. The telephone line record include at least one of i) customer information from a Customer Record Information System, ii) facility information from a Loop Facility Assignment Control System, and iii) equipment information from a switch system analyzing telephone switches. The maintenance report is generated using the acquired telephone line record. The process creates the maintenance report using fresh data.

35 Claims, 13 Drawing Sheets

OTHER PUBLICATIONS

Impact Voice Mail Server Deluxe, Black Ice Software Inc., CTI Expo, Spring 1999.

BellSouth Memory Call VoiceMail Services, 1999.

Voice Profile for Internet Mail—Version 2, G. Vaudreuil—Lucent Technologies and G. Parsons—Northern Telecom, Sep., 1998.

IP Infrastructure: The Fastest Track for Tomorrow's Unified Communications, Arthur Rosenburg and David Zimmer, The Unified View, Oct., 2000.

TDB: Computerized Call Return Feature, IBM Technical Disclosure Bulletin, Apr., 1986.

* cited by examiner

PROCESSES AND SYSTEMS FOR CREATING MAINTENANCE REPORTS FOR COMMUNICATIONS SYSTEMS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to work order management systems and, more particularly, to processes and systems for automatically creating maintenance reports for management activities and for governmental regulators.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance work orders. These hundreds of daily maintenance calls, and the resultant work orders, must be efficiently managed to prevent maintenance costs from eroding profits. These hundreds of daily maintenance calls, and work orders, must also be efficiently managed to ensure customers receive a quick response and resolution to their communication problems.

Because hundreds of work orders are generated each day, managers and governmental regulators receive maintenance reports detailing these work orders. These maintenance reports generally describe the customer's complaint, what maintenance is required to resolve the complaint, when a work order was created to resolve the complaint, and, finally, the status of the work order. Managers and governmental regulators then use these maintenance reports to monitor performance, costs, and customer satisfaction/service efforts.

These maintenance reports, however, are often inaccurate. The maintenance reports are frequently generated using old, out-of-date information. The maintenance report, for example, may indicate a cable repair is required, when the latest information indicates no facility is actually available. The maintenance report could also indicate a work order has yet to be assigned and dispatched, when, in fact, a technician has already made the repair and closed the work order. Because these maintenance reports are often constructed from inaccurate, aged information, managers and regulators have an inaccurate view of a communications system, of the status of work orders, and of customer service and satisfaction.

There is, accordingly, a need in the art for work order management systems that acquire fresh, up-to-date information, that create maintenance reports using accurate data, that accurately and quickly reflect true management and regulatory objectives and goals, and that reduce the costs of maintaining operations.

BRIEF SUMMARY OF THE INVENTION

The aforementioned problems are reduced by a Reporting Manager module. The Reporting Manager module comprises processes and systems that create and generate maintenance reports using real-time, up-to-date information. Maintenance reports, therefore, more accurately reflect the condition of a communication system. Managers have a more accurate view of the performance of field technicians and of maintenance crews. Governmental regulators also have a more accurate measurement of how well customers are treated and how fast customer problems are resolved. The Reporting Manager module, therefore, helps managers attain internal performance objectives and meet, or exceed, regulatory requirements.

The Reporting Manager module improves the efficiency of reporting maintenance activities. The Reporting Manager module may automatically generate maintenance reports, at any desired time and date, with any content a person should require. If, for example, a general manager requires a monthly maintenance report detailing all cable failures, the Reporting Manager module automatically acquires the information and generates this report. If a supervisor wants a weekly report of central office failures and alarms, the Reporting Manager module automatically acquires the desired information and generates this report. The Reporting Manager module may also automatically generate any maintenance reports a federal or state government agency should require. The Reporting Manager module may, therefore, automatically generate customized reports to improve the reporting of maintenance activities.

The Reporting Manager module, additionally, may automatically communicate the maintenance reports. The Reporting Manager module communicates the maintenance report via a communications network to users, to reporting systems, and to governmental regulatory agencies. The Reporting Manager module could email a maintenance report to a user, or the maintenance report could be automatically printed at the user's desired printer station. The Reporting Manager module could also automatically prepare a maintenance report for many reporting systems used within the telecommunications industry. The Reporting Manager module, for example, could generate maintenance reports for a Loop Cable Administration and Maintenance Operations System (LCAMOS) (more commonly referred to as "Predictor"), a Loop Engineering Information System (LEIS), a Loop Activity Tracking Information System (LATIS), and a Mechanized Trouble Analysis System (MTAS). The Reporting Manager module could even format a maintenance report to the reporting requirements of, for example, the Federal Communications Commission or a state/local public utilities commission. The Reporting Manager module would then communicate the formatted maintenance report along the communications network, in real-time and on-line, to a regulatory agency. Because the Reporting Manager module acquires the freshest data available, each maintenance report provides managers, users, the Federal Communications Commission, state and local utilities commissions, and others with an up-to-date, accurate picture of the communications system.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
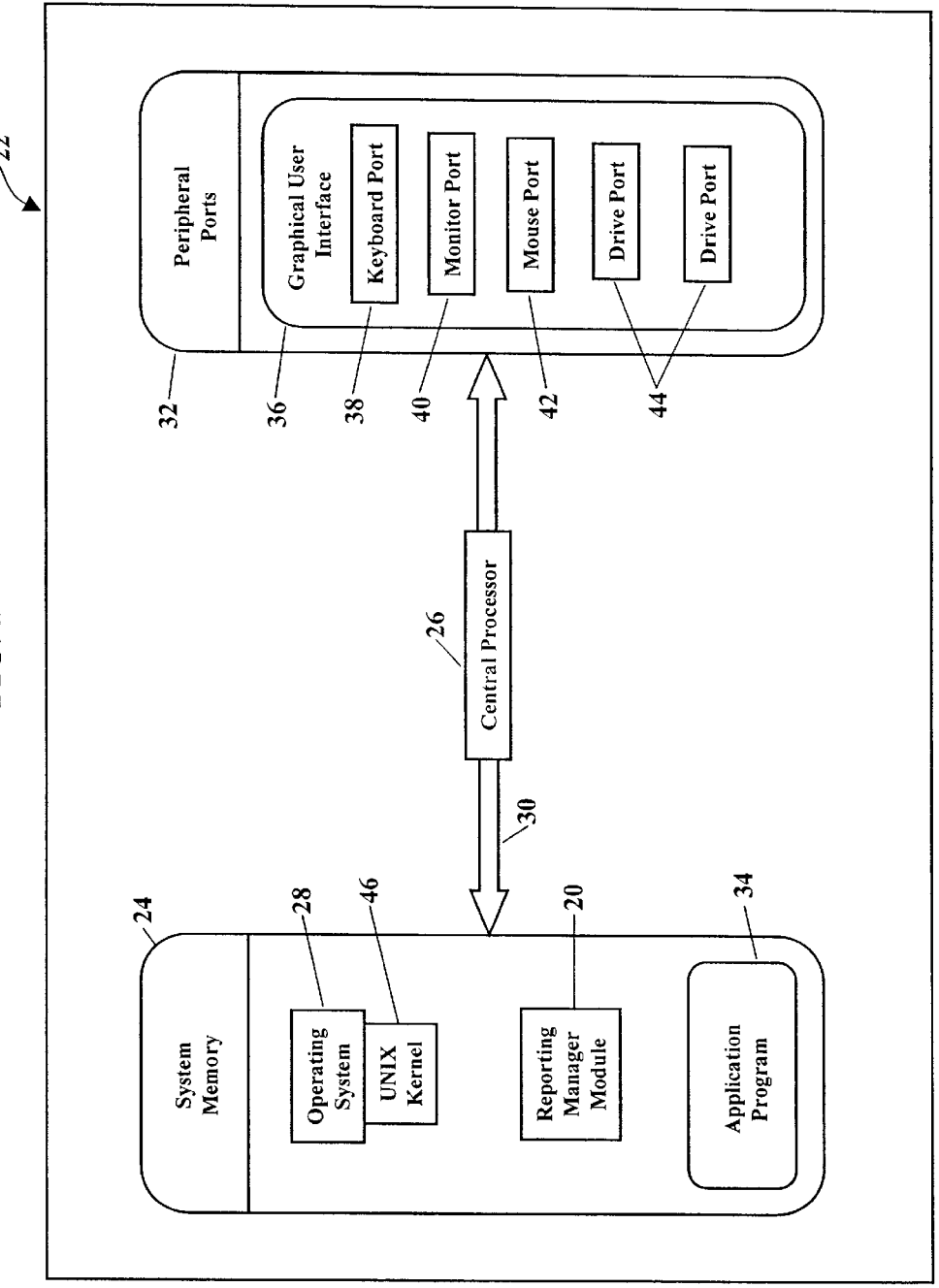
FIG. 1 is a block diagram showing a Reporting Manager module residing in a computer system.

The present invention particularly relates to processes and to systems for creating a maintenance report for a communications system. This maintenance report is then used to provide managers and users with an up-to-date, accurate picture of the operation of the communication system. Maintenance reports are also used to manage and to track open, pending work orders. These maintenance reports may also be used by the Federal Communications Commission and by state/local public utilities commissions to measure customer service activities.

One embodiment describes a process for creating this maintenance report. Here the process communicates with a communications network and acquires a telephone line record. A "telephone line record" describes a customer's telephone service, the condition of telephone system physical facility serving the customer, and the telephone equipment installed at the customer's residence or business. The telephone line record may include at least one of i) customer information from a Customer Record Information System, ii) facility information from a Loop Facility Assignment Control System, and iii) equipment information from a switch system that analyzes telephone switches. A telephone line record, in fact, may be assembled from many types of information. The assembly of this telephone line record is more fully shown and described in U.S. application Ser. No. 09/946,405, filed concurrently herewith, entitled METHODS AND SYSTEMS FOR ASSEMBLING TELEPHONE LINE RECORDS, and incorporated herein by reference in its entirety. Once the process acquires the telephone line record, the maintenance report is generated using information from the acquired telephone line record. The process thus creates the maintenance report using the freshest available data.

An alternative embodiment describes a computer program for creating the maintenance report for the communications system. This computer program communicates with a communications network and acquires a telephone line record. The telephone line record include at least one of i) customer information from a Customer Record Information System, ii) facility information from a Loop Facility Assignment Control System, and iii) equipment information from a switch system that analyzes telephone switches. The computer program generates the maintenance report by wire center at a user-specified date and time. The wire center designates a geographic area within the communications system. The maintenance report includes information from the acquired telephone line record. The computer program then prepares the maintenance report for a client. The program may communicate the maintenance report via the communications network to the client. The client includes at least one of a requesting user, a loop cable administration maintenance operation system, a loop engineering information system, a loop activity tracking information system, and a mechanized trouble analysis system. The computer program creates the maintenance report using fresh data.

A further embodiment describes a process of creating a maintenance report for a communications system. The process communicates with a communications network and requests a telephone line record. The telephone line record include at least one of i) customer information from a Customer Record Information System, ii) facility information from a Loop Facility Assignment Control System, and iii) equipment information from a switch system that analyzes telephone switches. The process then requests that the maintenance report be generated using information from the telephone line record, whereby the process requests the maintenance report using fresh data.

Another aspect discloses a computer program for creating a maintenance report for a communications system. The computer program communicates with a communications network and requests telephone line record. The telephone line record include at least one of i) customer information from a Customer Record Information System, ii) facility information from a Loop Facility Assignment Control System, iii) equipment information from a switch system that analyzes telephone switches. The computer program requests that the maintenance report be generated by wire center at a user-specified date and time. The wire center designates a geographic area within the communications system, and the maintenance report includes information from the acquired telephone line record. Once the maintenance report is generated, the computer program requests that the maintenance report be prepared for a client. The prepared maintenance report is then communicated via the communications network to the client. The client includes at least one of a requesting user, a loop cable administration maintenance operation system, a loop engineering information system, and a loop activity tracking information system. The computer program, therefore, requests the maintenance report using fresh data.

A further aspect also describes a process of creating a maintenance report for a communications system. The maintenance report, in this embodiment, describes the status of pending work orders for repair of the communication system. The process communicates with a communications network and acquires the telephone line record 68 to help resolve a problem in the communications system. The telephone line record comprises at least one of i) customer information from a Customer Record Information System, ii) facility information from a Loop Facility Assignment Control System, and iii) equipment information from a switch system that analyzes telephone switches. A work order is generated to repair the problem. The status of the work order is updated as the work order progresses through a work order management system. The maintenance report is generated using the updated status of the work order, whereby the process creates the maintenance report using the latest status of pending work orders.

A system is also disclosed for creating a maintenance report for a communications system. The system includes a Reporting Manager module and a processor. The Reporting Manager module acquires information from a telephone line record. The telephone line record comprises at least one of i) customer information from a Customer Record Information System, ii) facility information from a Loop Facility Assignment Control System, and iii) equipment information from a switch system that analyzes telephone switches. The Reporting Manager module generates the maintenance report using information from the acquired telephone line record, and the processor manipulates the information from the acquired telephone line record to generate the maintenance report.

A computer program product is also disclosed. The computer program product creates a maintenance report for a communications system. The computer program product includes a Reporting Manager module stored on a computer-readable medium. The Reporting Manager module acquires information from a telephone line record, with the telephone line record comprising at least one of i) customer information from a Customer Record Information System, ii) facility information from a Loop Facility Assignment Control System, and iii) equipment information from a switch system that analyzes telephone switches. The Reporting Manager module generates the maintenance report using the information from acquired telephone line record.

Figure 2:
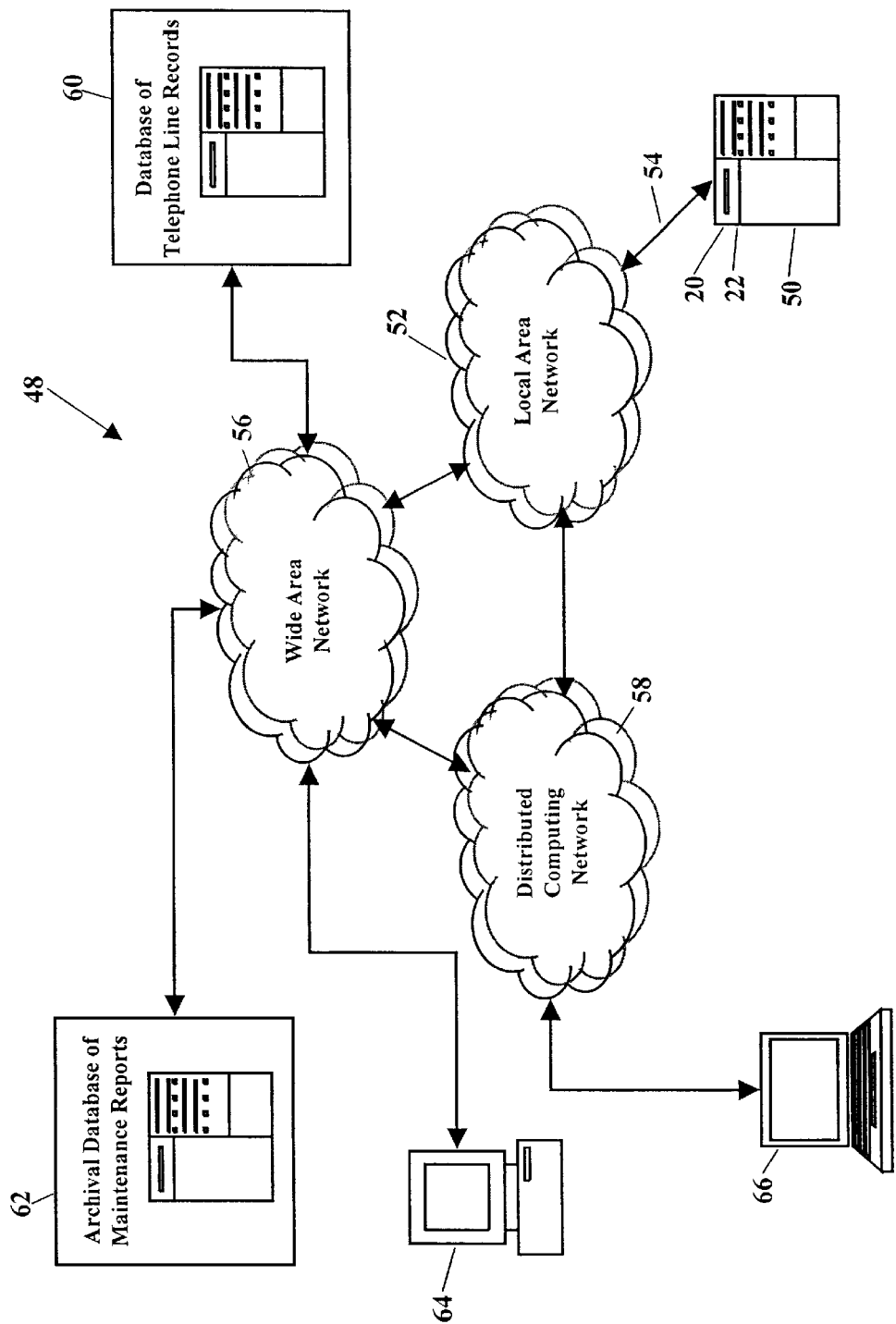
FIG. 2 is a block diagram of a communications network representing an operating environment for the Reporting Manager module.

FIGS. 1 and 2 depict a possible operating environment for an embodiment of the present invention. The embodiment shown in FIGS. 1 and 2 is a computer program that creates maintenance reports for communications systems. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Reporting Manager module 20 residing in a computer system 22. The Reporting Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450. The Intel Corporation also manufactures a family of X86 and P86 microprocessors (Intel Corporation, 2200 Mission College Blvd., Santa Clara, Calif. 95052-8119, 408.765.8080. Other manufactures also offer microprocessors. Such other manufactures include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacture's central processor.

The preferred operating system 28 is UNIX® operating system (UNIX® is a registered trademark of the Open Source Group). Those skilled in the art also recognize many other operating systems are suitable. Other suitable operating systems include UNIX-based Linux, WINDOWS NT® (WINDOWS NT® is a registered trademark of Microsoft Corporation, One Microsoft Way, Redmond Wash. 98052-6399, 425.882.8080), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a block diagram of a communications network 48. This communications network 48 further represents an operating environment for the Reporting Manager module 20. The Reporting Manager module 20 resides within the memory storage device (shown as reference numeral 24 in FIG. 1) in the computer system 22. The computer system 22 is conveniently shown as a computer server 50, however, the Reporting Manager module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Reporting Manager module 20 to request and acquire information from many computers connected to the Local Area Network 52, the Wide Area Network 56, and the globally-distributed computing network 58.

As FIG. 2 shows, the Reporting Manager module 20 sends and receives information to/from many other computers connected to the communications network 48. The Reporting Manager module 20, for example, may acquire a telephone line record from a server maintaining a database 60 of telephone line records. The Reporting Manager module 20 uses this telephone line record to generate a maintenance report and may then communicate the maintenance report over the communications network 48 to an archival database 62 of maintenance reports. The Reporting Manager module 20 may also communicate the maintenance report to a user at a user computer 64. Even remote users, such as programmers and engineers, may use a portable computer 66 to access the communications network 48 and remotely access the Reporting Manager module 20. Because many computers may be connected to the communications network 48, computers and computer users may share and communicate a vast amount of information.

Figure 3:
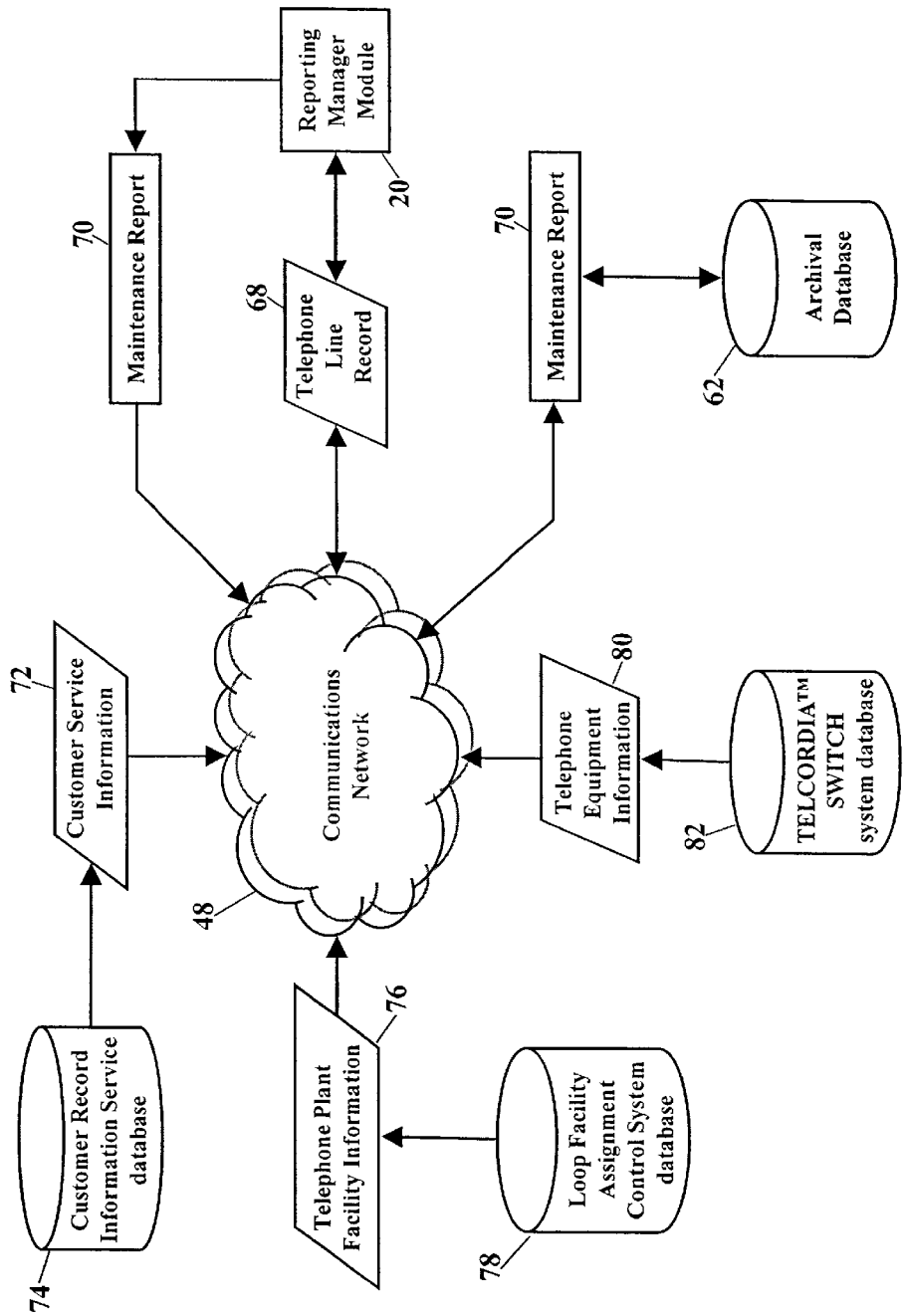
FIG. 3 is a schematic drawing showing one embodiment of the Reporting Manager module.

FIG. 3 is a schematic drawing showing one embodiment of the Reporting Manager module 20. The Reporting Manager module 20, in this embodiment, is a computer program that acquires information from a telephone line record 68 via the communications network 48. The Reporting Manager module 20 then uses the information from the telephone line record 68 to create a maintenance report 70. The telephone line record 68 is assembled from at least one of i) customer information 72 from a Customer Record Information System 74, ii) facility information 76 from a Loop Facility Assignment Control System 78, and iii) telephone equipment information 80 from a switch system that analyzes telephone switches. One such switch system is the TELCORDIA™ SWITCH system 82. The Reporting Manager module 20 may store the maintenance report 70 in the archival database 62 for future retrieval.

Figure 4:
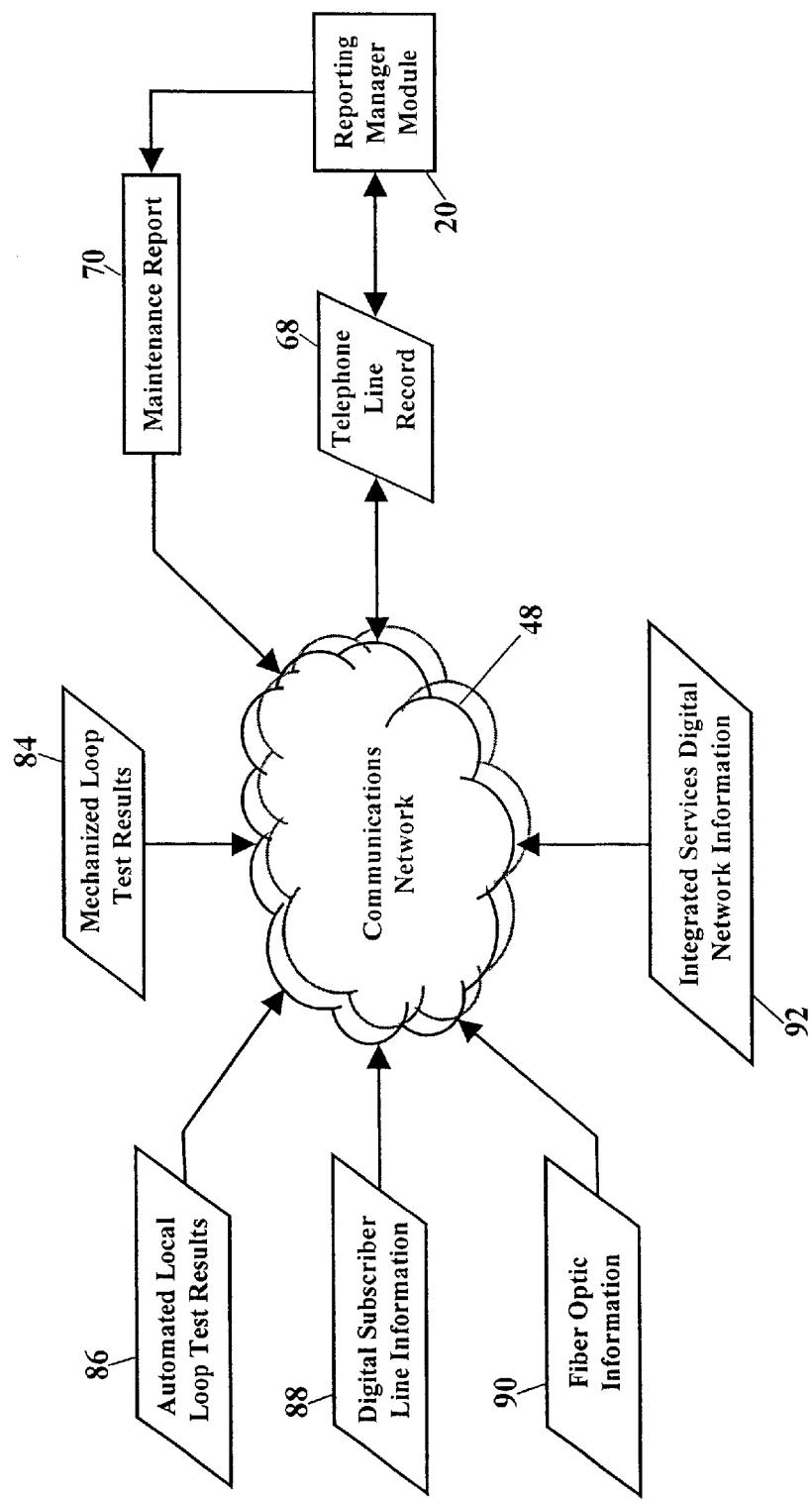
FIG. 4 is a schematic drawing of a further embodiment of the Reporting Manager module.

FIG. 4 is a schematic drawing of a further embodiment of the Reporting Manager module 20. FIG. 4 shows that the telephone line record 68 may include even more information that that shown in FIG. 3. The telephone line record 68, and thus the maintenance report 70, may include information from many other portions and subsystems within the communications system. The telephone line record 68, for example, may include mechanized loop test results 84 or other automated local loop test results 86. The telephone line record 68 could also include information from a digital subscriber line communication system 88, information from a fiber optic communication system 90, and information from an Integrated Services Digital Network communication system 92. The maintenance report 70 may thus provide an up-to-date, accurate picture of all facets and all portions of the communications system.

Figure 5:
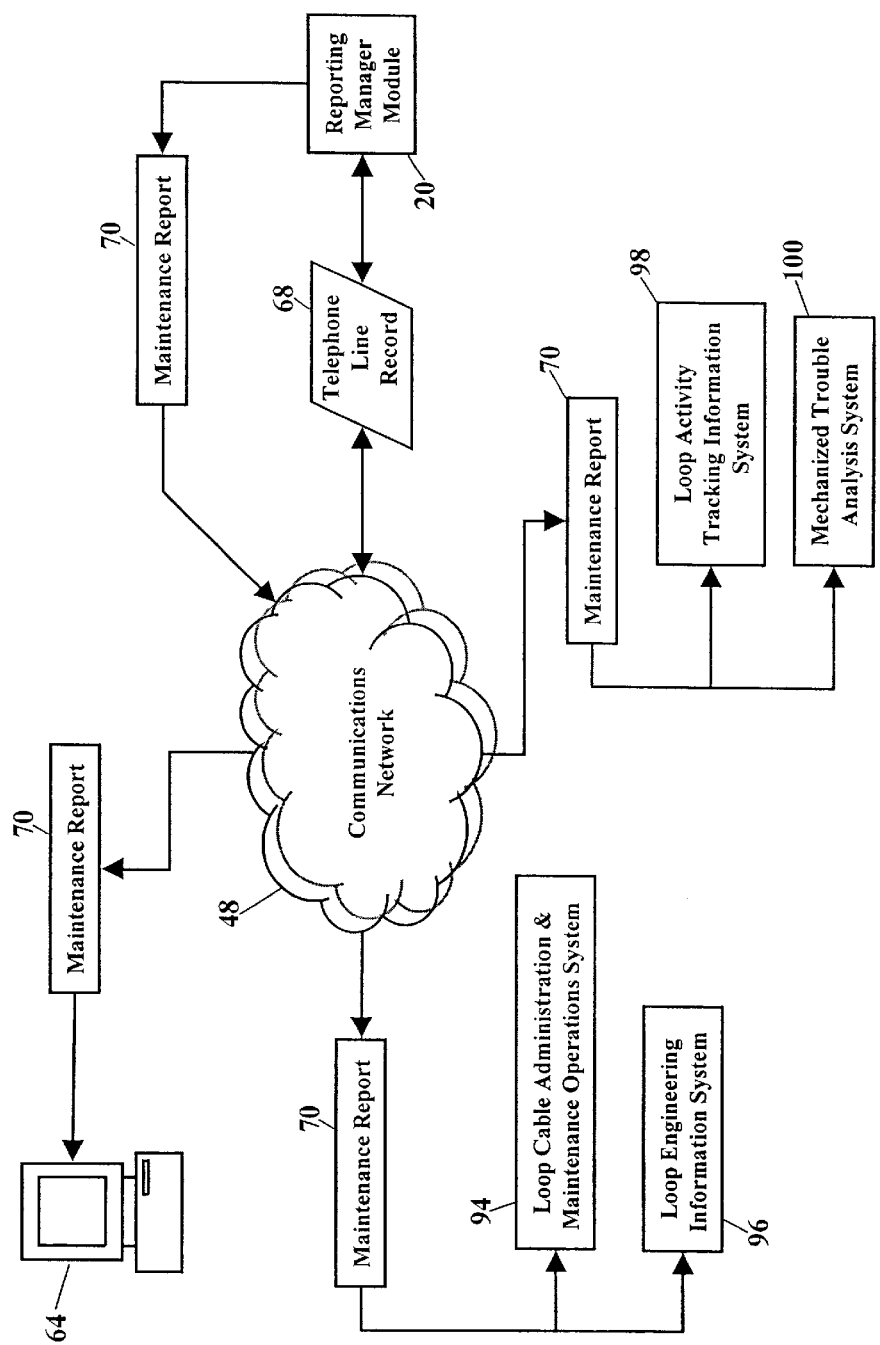
FIG. 5 is a schematic drawing showing another embodiment of the Reporting Manager module.

FIG. 5 is a schematic drawing showing another embodiment of the Reporting Manager module 20. FIG. 5 shows the Reporting Manager module 20 may prepare, format, and distribute the maintenance report 70. The Reporting Manager module 20 may, for example, send the maintenance report 70 to the communications network 48 for distribution to clients. The user at the user computer 64, for example, may request and receive the maintenance report 70. The maintenance report 70 may also be prepared for many reporting systems used within the telecommunications industry. These reporting systems include a Loop Cable Administration and Maintenance Operations System (LCAMOS) 94 (more commonly referred to as "Predictor"), a Loop Engineering Information System (LEIS) 96, a Loop Activity Tracking Information System (LATIS) 98, and a Mechanized Trouble Analysis System (MTAS) 100. Because the maintenance report 70 is composed of the freshest data available, each of these reporting systems provides managers, users, the Federal Communications Commission, state and local utilities commissions, and others with an up-to-date, accurate picture of the communications system.

Figure 6:
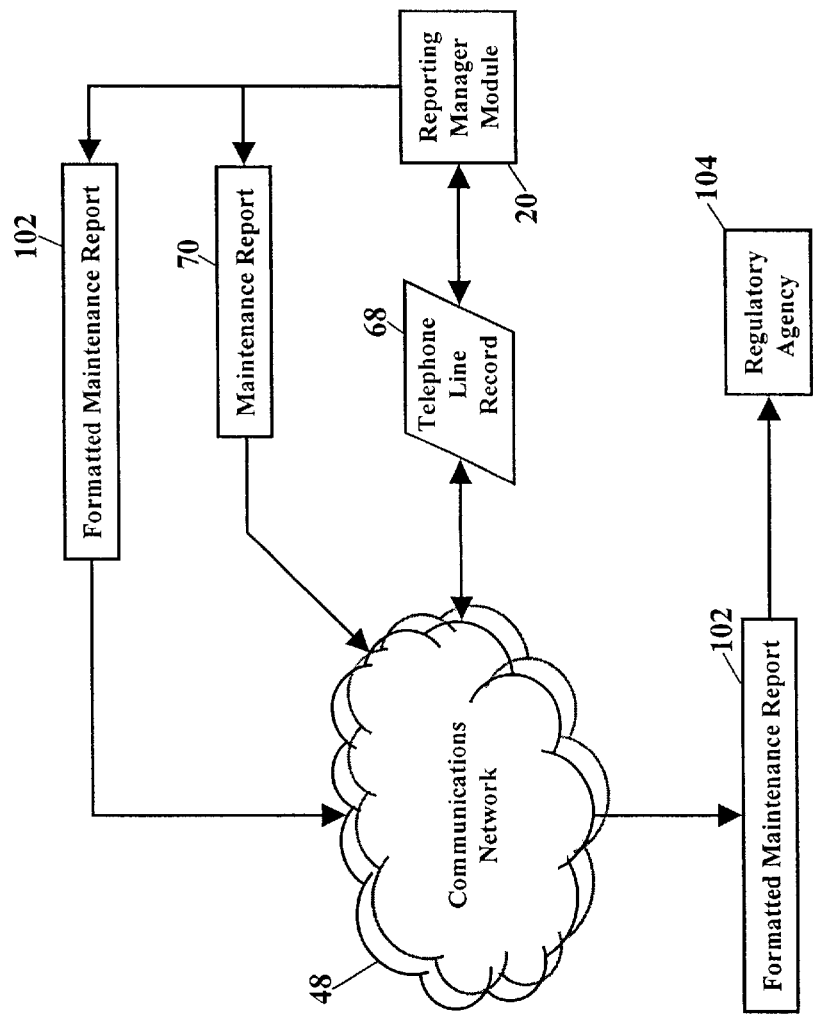
FIG. 6 is a schematic drawing showing still another embodiment of the Reporting Manager module.

FIG. 6 is a schematic drawing showing still another embodiment of the Reporting Manager module 20. As FIG. 5 suggests, FIG. 6 shows the maintenance report 70 may also report data to governmental regulatory agencies. Because governmental agencies often require periodic reporting to ensure regulatory compliance, the Reporting Manager module 20 may communicate the maintenance report 70 to a regulatory agency. The Reporting Manager module 20 could thus format the maintenance report 70 to the reporting requirements of, for example, the Federal Communications Commission or a state/local public utilities commission. The Reporting Manager module 20 may communicate a formatted maintenance report 102 along the communications network 48, in real-time and on-line, to a regulatory agency 104. The regulatory agency 104, of course, may be any governmental entity. The Reporting Manager module 20 thus reduces, and could even eliminate, the need for personnel to monitor and to report maintenance information.

Figure 7:
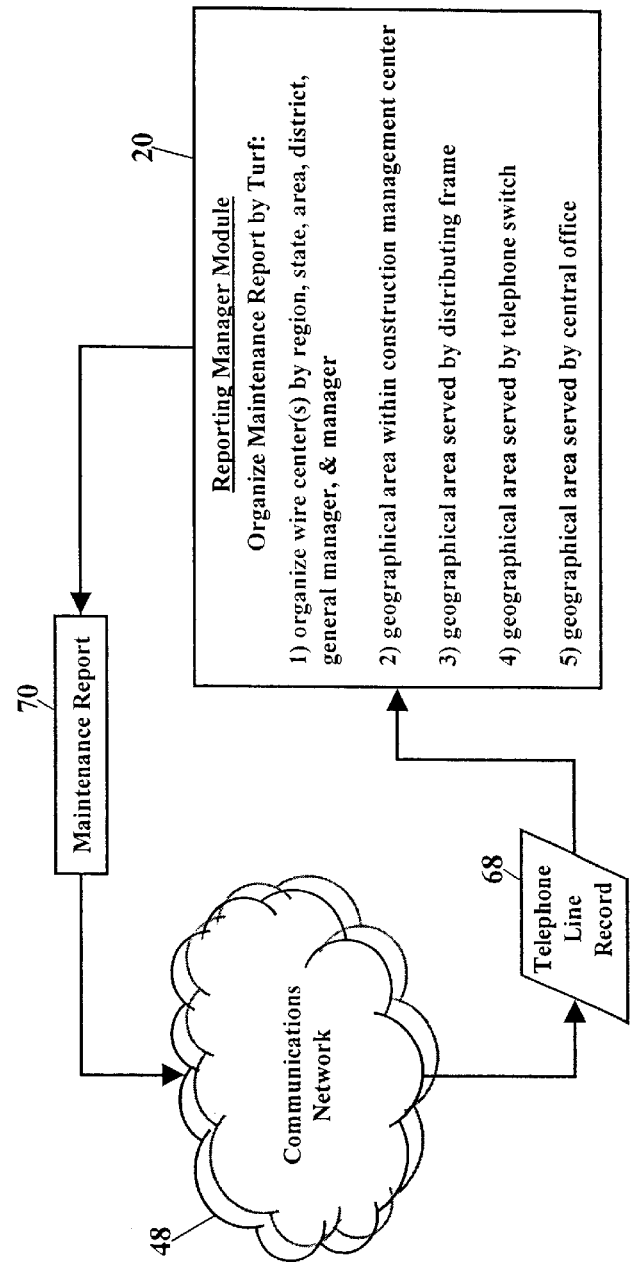
FIG. 7 is a schematic drawing showing the Reporting Manager module may organize a maintenance report.

FIG. 7 is a schematic drawing showing the Reporting Manager module 20 may organize the maintenance report 70. A communication system, of course, may have hundreds, thousands, or even millions of customers. These customers could be spread over tens or even hundreds of miles. The maintenance report 70 should present the information simply to promote efficient management of the communications system. The Reporting Manager module 20, therefore, organizes the maintenance report 70 by turf. A "turf" is a wire center or a collection of wire centers. Each turf would have a unique designation. The turf could include organizing one or more wire centers by region, state, area, district, general manager, and manager. A wire center, however, is the common component across any turf. When the Reporting Manager module 20 organizes the maintenance report 70 by turf, the Reporting Manager module 20 could organize the telephone line record 68, or the maintenance report 70, by a geographical area within a construction management center, a geographical area served by a distributing frame, a geographical area served by a telephone switch, and/or a geographical area served by a central office.

Figure 8:
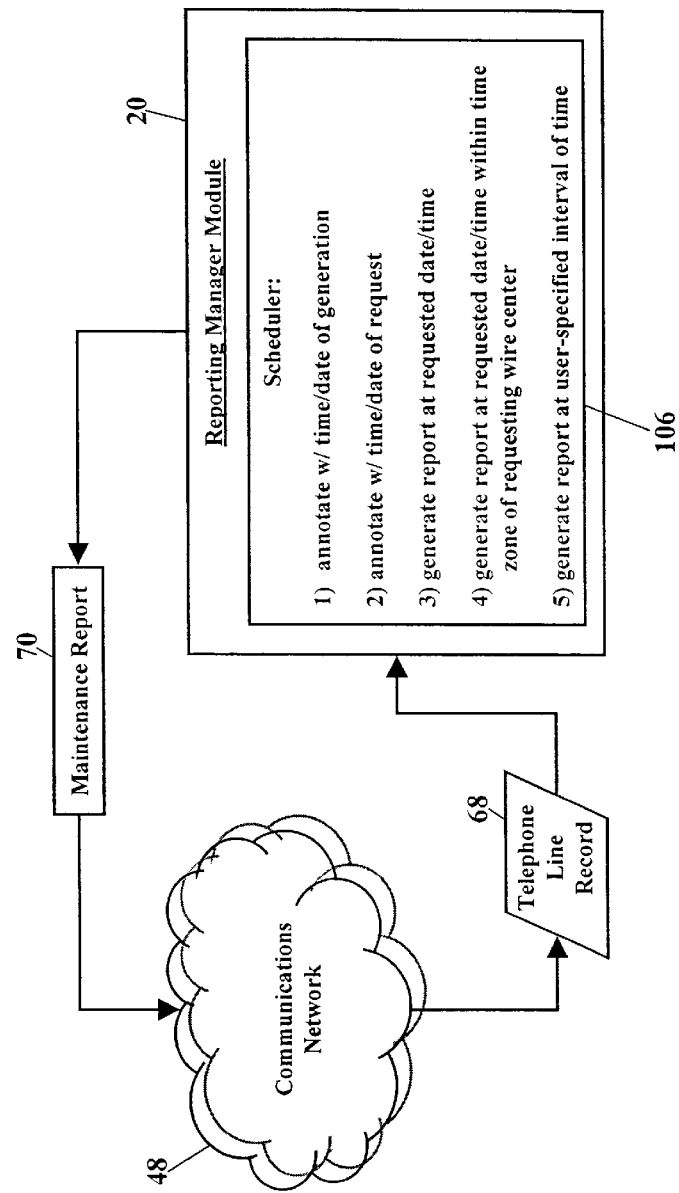
FIG. 8 is a schematic drawing showing the Reporting Manager module including a scheduler.

FIG. 8 is a schematic drawing showing the Reporting Manager module 20 including a scheduler 106. This embodiment allows the Reporting Manager module 20 to generate the maintenance report 70 at specific dates and times established by a user. The scheduler 106 could annotate the maintenance report 70 with a time and a date of generation or a time and date of any request for the maintenance report 70. The scheduler 106 could generate the maintenance report 70 at a requested date and time. The scheduler 106 would even generate the maintenance report 70 at a requested date and time within a time zone of a requesting wire center. The Reporting Manager module 20, and the scheduler 106, could be located in a different state and time zone from the client/user requesting the maintenance report 70. The Reporting Manager module 20 would, therefore, coordinate any request for the maintenance report 20 with the requesting client's/user's time zone. The Reporting Manager module 20 would then generate the maintenance report at the appropriate date and time of the client/user regardless of the local date and time of the Reporting Manager module 20. The Reporting Manager module 20 may also generate the maintenance report at a user-specified interval of time.

Figure 9:
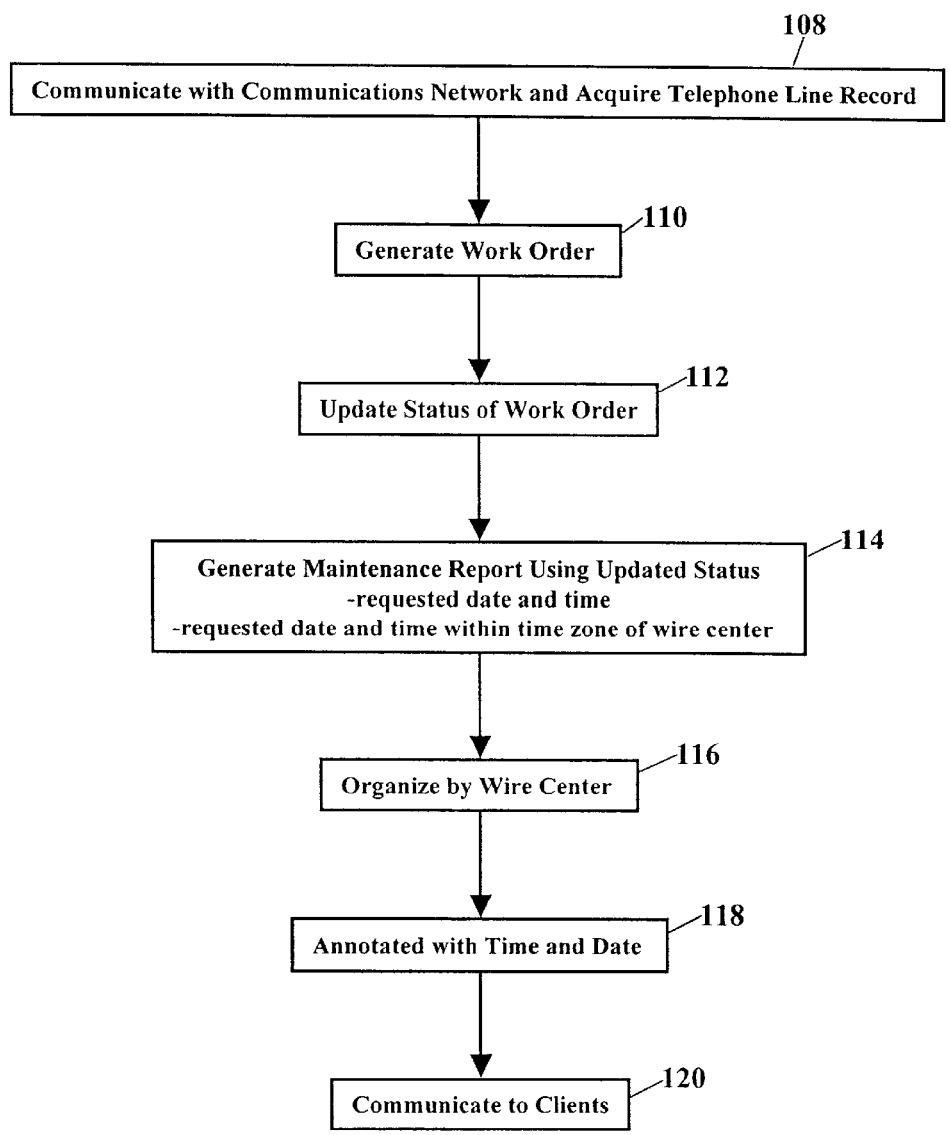
FIGS. 9 and 10 are flowcharts describing another embodiment of the Reporting Manager module.
Figure 10:
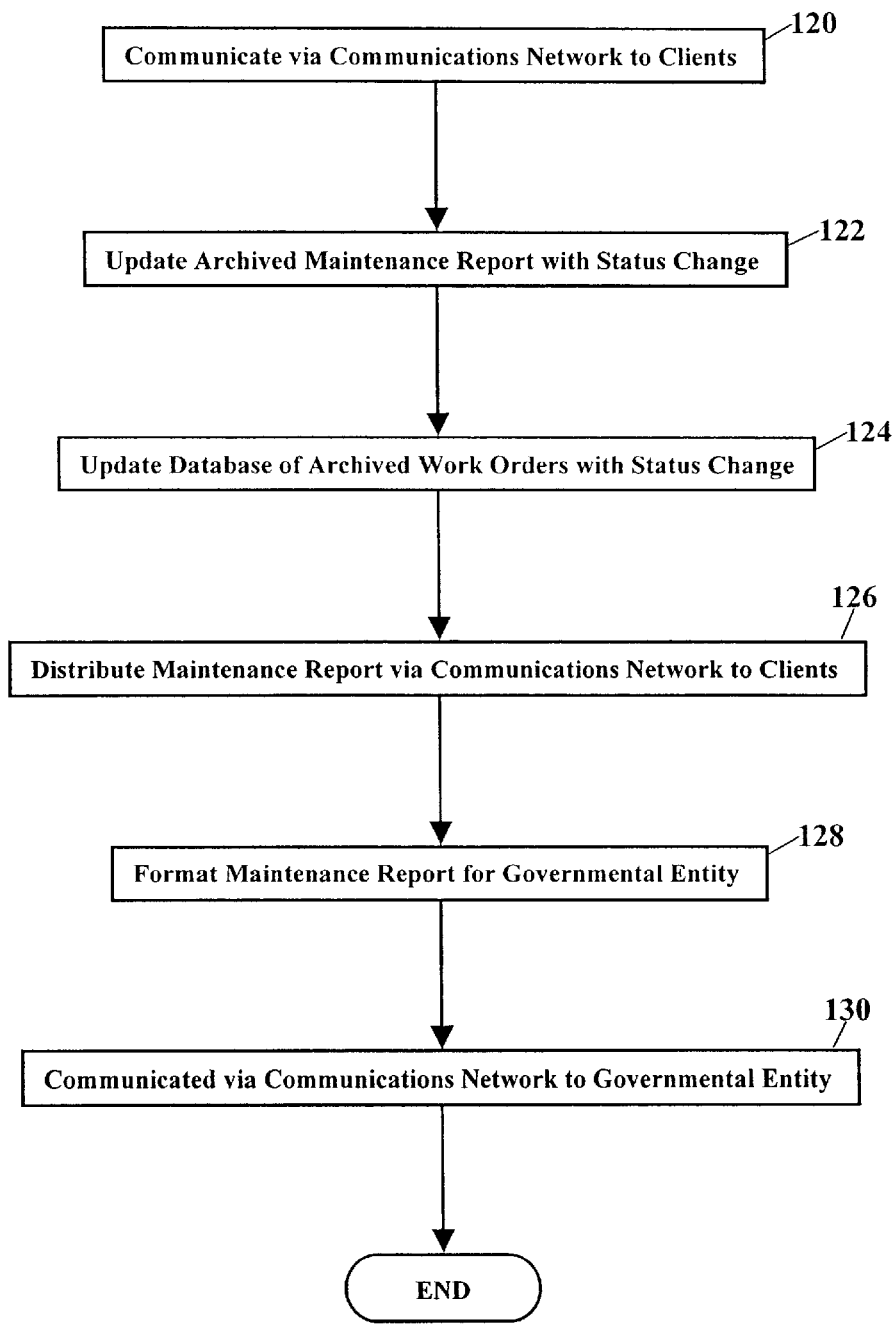

FIGS. 9 and 10 are flowcharts describing another embodiment of the Reporting Manager module 20. This embodiment also describes a process of creating a maintenance report for a communications system. The maintenance report 70, in this embodiment, describes the status of pending work orders for repair of the communication system. The process, as before, communicates with the communications network and acquires the telephone line record (Block 108). The telephone line record is assembled as shown and described with reference to FIGS. 3 and 4. The telephone line record helps resolve a problem in the communications system. A work order is generated to repair the problem (Block 110). The work order may include some or all of the information from the telephone line record. The status of the work order is then updated (Block 112) as the work order progresses through a work order management system to closure. The maintenance report is generated (Block 114) using the updated status of the work order. The maintenance report may be generated at a requested date and time or at a requested date and time within a time zone of a requesting wire center. The maintenance report may be organized by wire center (Block 116) to simply presentation (FIG. 7 and the accompanying text shows various wire center organizations). Once the maintenance report is created, the maintenance report may be annotated with a time and a date of generation (Block 118). As FIG. 10 further explains, the maintenance report may then be communicated to clients (Block 120).

FIG. 10 shows the process may communicate information over the communications network to clients (Block 120). An archived maintenance report, for example, may be updated with each changing status of the work order (Block 122). A database of archived work orders may also be updated with each changing status of the work order (Block 124). The maintenance report may also be distributed via the communications network to clients (Block 126). The clients, as discussed with reference to FIG. 5, could include at least one of i) a loop cable administration maintenance operation system, ii) a loop engineering information system, iii) a loop activity tracking information system, and iv) a mechanized trouble analysis system. The maintenance report could also be formatted for a governmental entity (Block 128) and then communicated the via the communications network to the governmental entity (Block 130).

Figure 11:
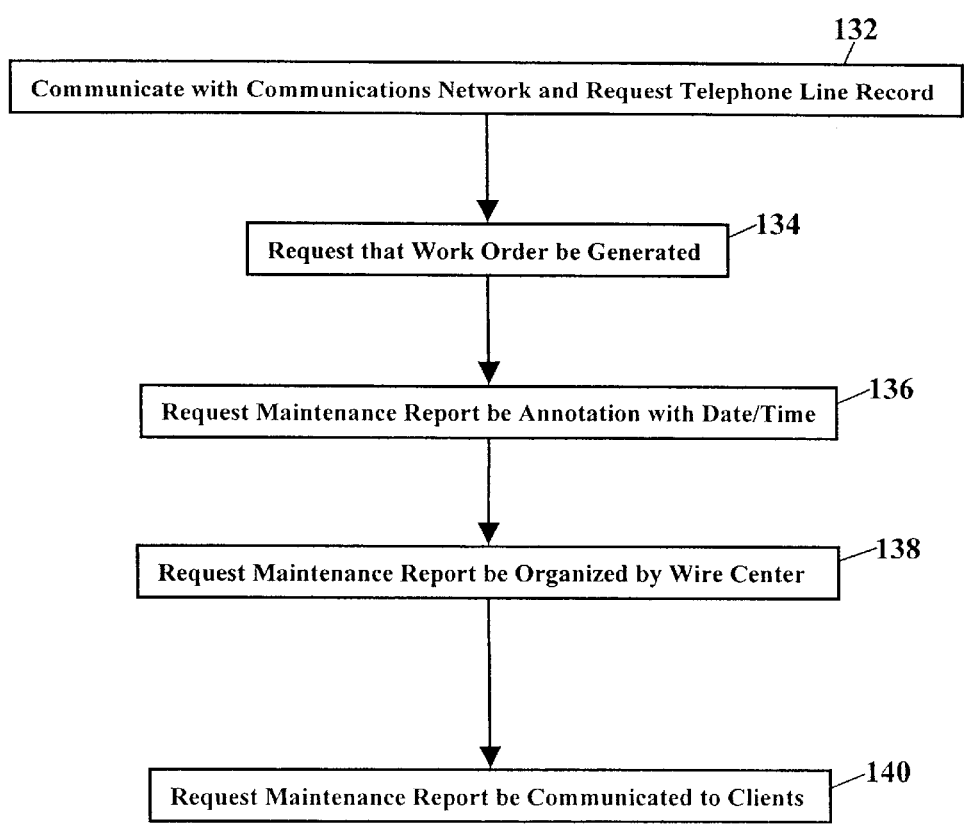
FIGS. 11 and 12 are flowcharts describing still another embodiment of the Reporting Manager module.
Figure 12:
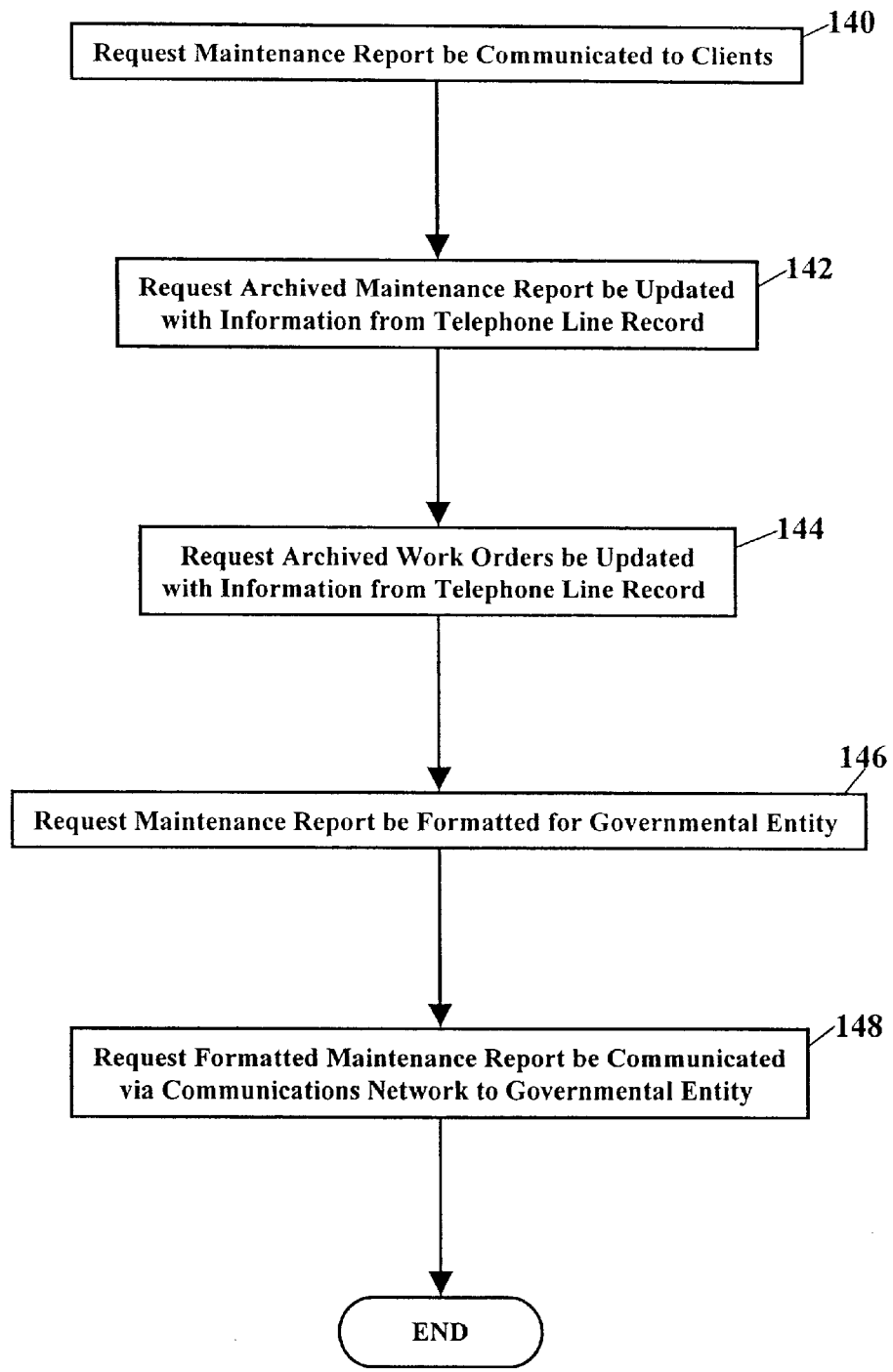

FIGS. 11 and 12 are flowcharts describing still another embodiment of the Reporting Manager module 20. This embodiment reflects a network-centric version, meaning the Reporting Manager module 20 communicates various requests to have the maintenance report generated. This embodiment communicates with the communications network and requests a telephone line record (Block 132). The telephone line record is assembled as shown and described with reference to FIGS. 3 and 4. The Reporting Manager module 20, as before, may request the telephone line record include at least one of i) results from a mechanized loop test, ii) results from an automated local loop test system, iii) information from a digital subscriber line communication system, iv) information from a fiber optic communication system, and v) information from an Integrated Services Digital Network communication system. A request is sent to generate the maintenance report (Block 134), with the maintenance report comprising information from the telephone line record. The request may specify that the maintenance report be generated at a requested date and time, at a requested date and time within a time zone of a requesting wire center, and/or at a user-specified interval of time. The request may specify that the maintenance report be annotated with a time and a date (Block 136) and be organized by wire center (Block 138). As FIG. 12 further explains, the process may then request that the maintenance report be communicated to clients (Block 140).

FIG. 12 shows the process may request information be communicated over the communications network to clients (Block 140). The Reporting Manager module 20, for example, may request that an archived maintenance report be updated with information from the telephone line record (Block 142). The process could also request that a database of archived work orders be updated with information from the telephone line record (Block 144). The process may request that the maintenance report be sent to the communications network for distribution to clients. The clients, as discussed with reference to FIG. 5, could include at least one of i) a loop cable administration maintenance operation system, ii) a loop engineering information system, iii) a loop activity tracking information system, and iv) a mechanized trouble analysis system. The Reporting Manager module 20 may also communicate a request to format the maintenance report for a governmental entity (Block 146), and the request that the formatted maintenance report be communicated via the communications network to a governmental entity (Block 148).

The Reporting Manager module (shown as reference numeral 20 in FIGS. 1–6) may be physically embodied on or in a computer-readable medium. The computer-readable medium includes CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer readable media, and other types not mentioned here but considered within the scope of the present invention, allow the Reporting Manager module to be easily disseminated. A computer program product for creating a maintenance report for a communications system includes the Reporting Manager module stored on the computer-readable medium. The Reporting Manager module acquires information from a telephone line record. The telephone line record comprises at least one of i) customer information from a Customer Record Information System, ii) facility information from a Loop Facility Assignment Control System, and iii) equipment information from a TELCORDIA™ SWITCH system. The Reporting Manager module generates the maintenance report using information form the acquired telephone line record.

EXAMPLE

Figure 13:
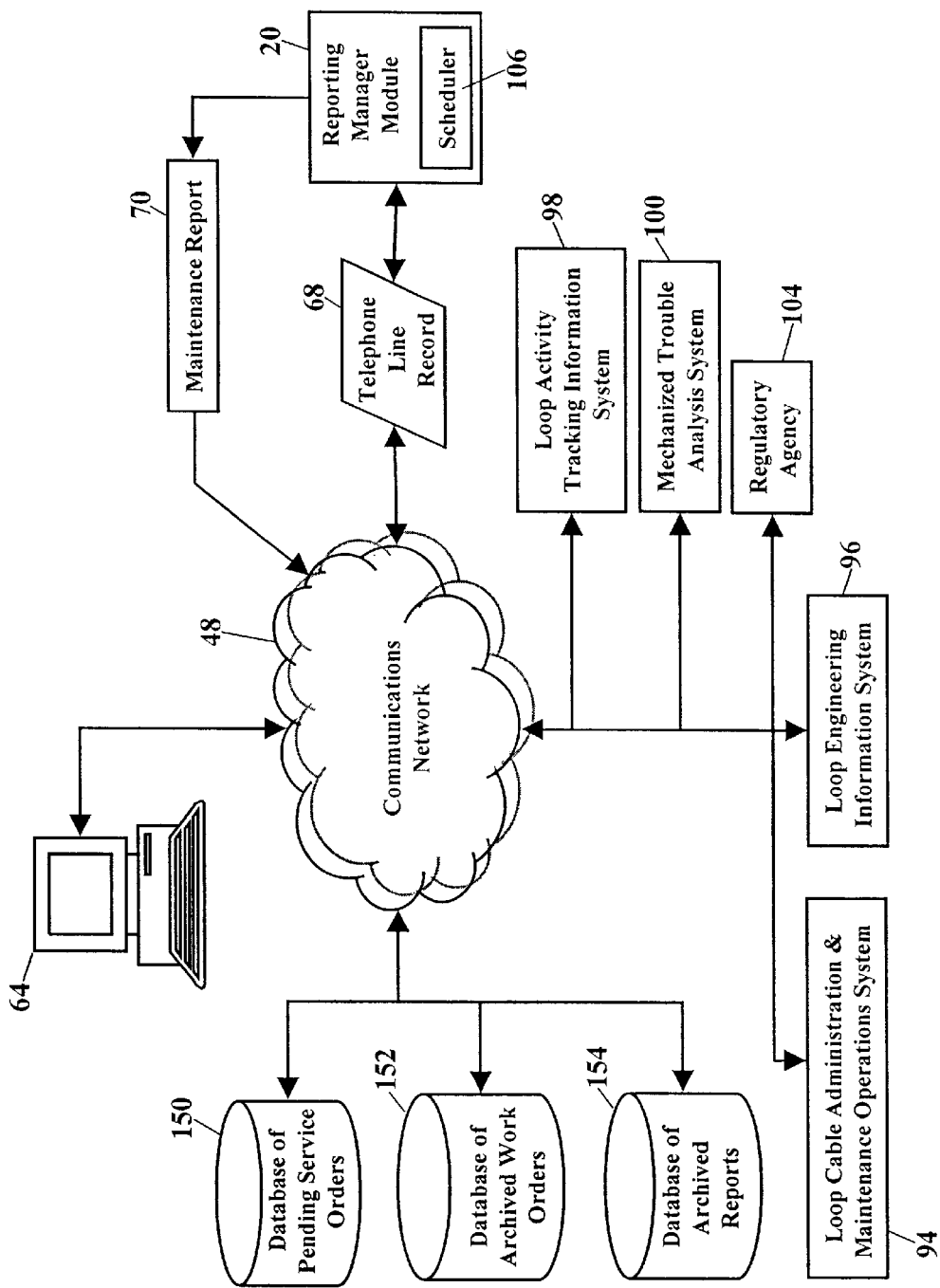
FIG. 13 is a schematic drawing of a non-limiting example.

The Reporting Manager module 20 is further illustrated by the following non-limiting example. FIG. 13 is a schematic drawing of this non-limiting example. Here the user, at the user computer 64, communicates with the Reporting Manager module 20 via the communications network 48. The user establishes various parameters that define the content of the maintenance report 70. The user may also utilize the scheduler 106 to establish at what time and at what date the maintenance report 70 is generated. The Reporting Manager module 20 then interfaces with client computers, via the communications network 48, to create and to generate the maintenance report 70. These clients include a database 150 of pending work orders, a database 152 of archived work orders, and a database 154 of archived maintenance reports. The Reporting Manager module 20, for example, acquires, the status change of a pending work order, as the work order progresses from creation to closure, from the database 150 of pending work orders. The Reporting Manager module 20 may also acquire information from the database 152 of archived work orders to create the maintenance report 70. The Reporting Manager module 20 could also acquire information from the telephone line record 68 to create the maintenance report 70. The Reporting Manager module 20, if required, would also update the database 154 of archived maintenance reports with information from any status change or with information from the telephone line record 68. Once the maintenance report 70 is generated, the Reporting Manager module 20 could then prepare, format, and distribute the maintenance report 70, via the communications network 48, to a client reporting system (shown as the Loop Cable Administration and Maintenance Operations System 94, the Loop Engineering Information System 96, the Loop Activity Tracking Information System 98, the Mechanized Trouble Analysis System 100, and the regulatory agency 104).

The user, as mentioned above, may define the time/date of generation and the content of the maintenance report 70. The user, at the user computer 64, may utilize the scheduler 104 to establish at what time and at what date the maintenance report 70 is generated. The user computer 64, may also specify a period for which the pending work order is archived in the database 150 of archived work orders. The Reporting Manager 20 could also offer a selection of standardized maintenance reports, or the user may define their own ad-hoc content and format. Below is a listing of just a few standardized maintenance reports from which the user may select:

Differences between work order and Integrated Dispatch System ticket;
Central Office alarms by equipment and type
Central Office failures
Linked work orders
Work order queue
Work order & job information
Cable failures
Work order(s) status history
Central Office Failure (COF) file
Correlated work orders
Turf rules and parameters
Screened work items in Management Center
Screening Activities performed by screener
Pending cable close count
Cable report status
Programmed Scan test list
Basic output report
Jeopardy report
No access report
Out of Service list
Status report
Summary trouble status report
Work items pending dispatch, or dispatched, by wire center
Work items pending dispatch, or dispatched, by cable
Items requiring processing within a Management Center, a screening Management Center, Maintenance Administrators The user could also have the ability to retrieve previously-saved ad-hoc maintenance reports. The user may even be permitted to edit or delete previously-saved ad-hoc maintenance reports. The Reporting Manager module 20 could also target aged ad-hoc reports. Because any ad-hoc maintenance report may not be required for a recognized reporting system, ad-hoc maintenance reports may become unnecessary to repeatedly generate. The Reporting Manager module 20, therefore, could inquire whether an aged ad-hoc maintenance reporting script should be deleted at the end of the aging period. If the user doesn't respond to the inquiry, then the ad-hoc maintenance report could be deleted or targeted for deletion.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process of creating a maintenance report for a communications system, the process comprising steps of:
    communicating with a communications network and acquiring a telephone line record, the telephone line record comprising at least one of i) customer information from a Customer Record Information System, ii) facility information from a Loop Facility Assignment Control System, and iii) equipment information from a switch system analyzing telephone switches;
    generating the maintenance report using information from the acquired telephone line record at a requested date and time within a time zone of a requesting wire center;
    formatting the maintenance report to a reporting requirement of a user;
    communicating the maintenance report along the communications network, in real-time and on-line to the user;
    storing the generated maintenance report, a previously stored maintenance report being deleted at an end of the previously stored maintenance report's archive period after inquiry to the user,
    whereby the process creates the maintenance report using fresh data.

2. A process of creating a maintenance report according to claim 1, further comprising annotating the maintenance report with a time and a date of generation.

3. A process of creating a maintenance report according to claim 1, wherein generating the maintenance report further includes generating the maintenance report at a user-specified interval of time.

4. A process of creating a maintenance report according to claim 1, wherein acquiring the telephone line record comprises acquiring at least one of i) results from a mechanized loop test, ii) results from an automated local loop test system, iii) information from a digital subscriber line communication system, iv) information from a fiber optic communication system, and v) information from an Integrated Services Digital Network communication system.

5. A process of creating a maintenance report according to claim 1, further comprising organizing the maintenance report by the wire center.

6. A process of creating a maintenance report according to claim 5, wherein organizing the maintenance report by the wire center comprises organizing the maintenance report by at least one of i) a geographical area within a construction management center, ii) a geographical area served by a distributing frame, iii) a geographical area served by a telephone switch, and iv) a geographical area served by a central office.

7. A process of creating a maintenance report according to claim 1, further comprising updating an archived maintenance report with information from the telephone line record.

8. A process of creating a maintenance report according to claim 1, further comprising updating a database of archived work orders with the information from telephone line record.

9. A process of creating a maintenance report according to claim 1, wherein formatting the maintenance report includes formatting the maintenance report to the requirement report to the user having at least one of i) a loop cable administration maintenance operating system, ii) a loop engineering information system, iii) a loop activity tracking information system, and iv) a mechanized trouble analysis system.

10. A process of creating a maintenance report according to claim 1, wherein the user includes a governmental entity.

11. A process of creating a maintenance report according to claim 1, further comprising communicating the maintenance report via the communications network to a governmental entity.

12. A computer program for creating a maintenance report for a communications system, the computer program comprising of:

communicating with a communications network and acquiring a telephone line record, the telephone line record comprising at least one of i) customer information from a Customer Record Information System, ii) facility information from a Loop Facility Assignment Control System, and iii) equipment information from a switch system analyzing telephone switches;

generating the maintenance report by a wire center at a user-specified date and time, the wire center designating a geographic area within the communications system, the maintenance report comprising information from the acquired telephone line record;

formatting the maintenance report to a reporting requirement of a client;

preparing and storing the maintenance report for the client, a report of previously stored maintenance report being deleted at an end of the previously stored maintenance report's archive period after inquiry to the client; and communicating the prepared maintenance report via the communications network in real-time and on-line to the client, the client comprising at least one of a requesting user, a loop cable administration maintenance operation system, a loop engineering information system, a loop activity tracking information system, and a mechanized trouble analysis system, whereby the computer program creates the maintenance report using fresh data.

13. A process of creating a maintenance report for a communications system, the process comprising:

communicating with a communications network and requesting a telephone line record, the telephone line record comprising at least one of i) customer information from a Customer Record Information System, ii) facility information from a Loop Facility Assignment Control System, and iii) equipment information from a switch system analyzing telephone switches;

requesting that the maintenance report be generated using information from the telephone line record at a requested date and time within a time zone of a requesting wire center; and requesting that the maintenance report be formatted to a reporting requirement of a client;

requesting that the maintenance report be communicated to the client along the communications network, in real-time and on-line;

storing the requested maintenance report, an previously stored maintenance report being deleted at an end of the previously stored maintenance report's archive period after inquiry to the client, whereby the process creates the maintenance report using fresh data.

14. A process of creating a maintenance report according to claim 13, further comprising requesting that the maintenance report be annotated with a time and a date of generation.

15. A process of creating a maintenance report according to claim 13, wherein requesting that the maintenance report be generated further includes requesting that the maintenance report be generated at a user-specified interval of time.

16. A process of creating a maintenance report according to claim 13, wherein requesting the telephone line record comprises requesting at least one of i) results from a mechanized loop test, ii) results from an automated local loop test system, iii) information from a digital subscriber line communication system, iv) information from a fiber optic communication system, and v) information from an Integrated Services Digital Network communication system.

17. A process of creating a maintenance report according to claim 13, further comprising requesting that the maintenance report be organized by the wire center.

18. A process of creating a maintenance report according to claim 17, wherein requesting that the maintenance report be organized by the wire center comprises requesting that the maintenance report be organized by at least one of i) a geographical area within a construction management center, ii) a geographical area served by a distributing frame, iii) a geographical area served by a telephone switch, and iv) a geographical area served by a central office.

19. A process of creating a maintenance report according to claim 13, further comprising requesting that an archived maintenance report be updated with information from the telephone line record.

20. A process of creating a maintenance report according to claim 13, further comprising requesting that a database of archived work orders be updated with the information from the telephone line record.

21. A process of creating a maintenance report according to claim 13, wherein requesting that the maintenance report be formatted includes requesting that the maintenance report be formatted to the reporting requirement of the client having at least one of i) a loop cable administration maintenance operating system, ii) a loop engineering information system, and iii) a loop activity tracking information system.

22. A process of creating a maintenance report according to claim 13, wherein the client includes a governmental entity.

23. A computer program for creating a maintenance report for a communications system, the computer program comprising:

communicating with a communications network and requesting a telephone line record, the telephone line record comprising at least one of i) customer information from a Customer Record Information System, ii) facility information from a Loop Facility Assignment Control System, iii) equipment information from a switch system analyzing telephone switches;

requesting that the maintenance report be generated by wire center at a user-specified date and time, the wire center designating a geographic area within the communications system, the maintenance report comprising information from the acquired telephone line record;

requesting that the maintenance report be formatted to a reporting requirement for a client and the prepared maintenance report be stored, a previously stored maintenance report being deleted at an end of the previously stored maintenance report's archive period after inquiry to the client; and requesting that the prepared maintenance report be communicated via the communications network in real time and on-line to the client, the client comprising at least one of a requesting user, a loop cable administration maintenance operation system, a loop engineering information system, and a loop activity tracking information system, whereby the computer program creates the maintenance report using fresh data.

24. A process of creating a maintenance report for a communications system, the maintenance report describing the status of pending work orders for repair of the communication system, the process comprising:

communication with a communications network and acquiring a telephone line record to help resolve a problem in the communications system, the telephone line record comprising at least one of i) customer information from a Customer Record Information System, ii) facility information from a Loop Facility Assignment Control System, and iii) equipment information from a switch system analyzing telephone switches;

generating a work order to repair the problem;

updating the status of the work order as the work order progresses through a work order management system;

generating the maintenance report using the updated status of the work order at a requested date and time within a time zone of a requesting wire center;

formatting the maintenance report to a reporting requirement of a user;

communicating the maintenance report to the user along the communications network, in real-time and on-line;

storing the maintenance report, a previously stored maintenance report being deleted at an end of the previously stored maintenance report's archive period after inquiry to the user, whereby the process creates the maintenance report using the latest status of pending work orders.

25. A process of creating a maintenance report according to claim 24, further comprising annotating the maintenance report with a time and a date of generation.

26. A process of creating a maintenance report according to claim 24, wherein the telephone line record comprises acquiring at least one of i) results from a mechanized loop test, ii) results from an automated local loop test system, iii) information from a digital subscriber line communication system, iv) information from a fiber optic communication system, and v) information from an Integrated Services Digital Network communication system.

27. A process of creating a maintenance report according to claim 24, further comprising organizing the maintenance report by the wire center.

28. A process of creating a maintenance report according to claim 27, wherein organizing the maintenance report by the wire center comprises organizing the maintenance report by at least one of i) a geographical area withing a construction management center, ii) a geographical area served by a distributing frame, iii) a geographical area served by a telephone switch, and iv) a geographical area served by a central office.

29. A process of creating a maintenance report according to claim 24, further comprising updating an archived maintenance report with the updated status of the work order.

30. A process of creating a maintenance report according to claim 24, further comprising updating a database of archived work orders with the updated status of the work order.

31. A process of creating a maintenance report according to claim 24, wherein formatting the maintenance report includes formatting the maintenance report to the reporting requirement of the user having at least one of i) a loop cable administration maintenance operating system, ii) a loop engineering information system, iii) a loop activity tracking information system, and iv) a mechanized trouble analysis system.

32. A process of creating a maintenance report according to claim 24, wherein the user includes a governmental entity.

33. A process of creating a maintenance report according to claim 24, further comprising communicating the maintenance report via the communications network to a governmental entity.

34. A process of creating a maintenance report for a communications system, comprising:

a Reporting Manage module acquiring a telephone line record, the telephone line record comprising at least one of i) customer information from a Customer Record Information System, ii) facility information from a Loop Facility Assignment Control System, and iii) equipment information from a switch system analyzing telephone switches, the Reporting Manager module generating the maintenance report using the acquired telephone line record; and a processor capable of manipulating the telephone line record to generate the maintenance report, formatting the maintenance report to a reporting requirement of a user, communicating the maintenance report to the user via the communications system in real-time and on-line, storing the generated maintenance report and deleting a previously stored maintenance report at an end of the previously stored maintenance report's archive period after inquiry to the user.

35. A computer program product for creating a maintenance report for a communications system, comprising:

a computer-readable medium; and a Reporting Manage module stored on the computer-readable medium, the Reporting Manage module acquiring information from a telephone line record, the telephone line record comprising at least one of i) customer information from a Customer Record Information System, ii) facility information from a Loop Facility Assignment Control System, and iii) equipment information from a switch system analyzing telephone switches, the Reporting Manager module generating the maintenance report using information from the acquired telephone line record, formating the maintenance report to a reporting requirement of a user, communicating the maintenance report to the user via the communications system in real-time and on-line, storing the generated maintenance report and deleting a stored maintenance report at an end of the previously stored maintenance report's archive period after inquiry to the user.

* * * * *